United States Patent
Du et al.

(10) Patent No.: US 9,865,267 B2
(45) Date of Patent: Jan. 9, 2018

(54) COMMUNICATION METHOD, APPARATUS AND SYSTEM BASED ON VOICEPRINT

(71) Applicant: BAIDU ONLINE NETWORK TECHNOLOGY (BEIJING) CO., LTD., Beijing (CN)

(72) Inventors: Niandong Du, Beijing (CN); Chao Li, Beijing (CN); Yan Xie, Beijing (CN)

(73) Assignee: BAIDU ONLINE NETWORK TECHNOLOGY (BEIJING) CO., LTD., Beijing (CN)

(*) Notice: Subject to any disclaimer, the term of this patent is extended or adjusted under 35 U.S.C. 154(b) by 0 days.

(21) Appl. No.: 14/962,711

(22) Filed: Dec. 8, 2015

(65) Prior Publication Data

US 2017/0004832 A1 Jan. 5, 2017

(30) Foreign Application Priority Data

Jun. 30, 2015 (CN) .......................... 2015 1 0372778

(51) Int. Cl.
*G10L 17/00* (2013.01)
*G10L 17/24* (2013.01)
*G06F 21/32* (2013.01)
*G06F 21/31* (2013.01)

(52) U.S. Cl.
CPC .............. *G10L 17/24* (2013.01); *G06F 21/31* (2013.01); *G06F 21/32* (2013.01)

(58) Field of Classification Search
CPC ..... H04L 63/08; H04L 63/0861; G06F 21/31; G06F 21/32; G10L 17/00
See application file for complete search history.

(56) References Cited

U.S. PATENT DOCUMENTS 6,615,171 B1 * 9/2003 Kanevsky .............. G10L 15/30
704/246
6,973,426 B1 * 12/2005 Schier .................... G10L 17/22
704/246

(Continued)

FOREIGN PATENT DOCUMENTS

CN 101685635 A 3/2010
CN 102869008 A 1/2013

(Continued)

OTHER PUBLICATIONS

Chinese Patent Application No. 201510372778.X First Office Action with English translation, dated Jul. 26, 2017, 14 pages.

(Continued)

*Primary Examiner* — Jialong He
(74) *Attorney, Agent, or Firm* — Lathrop Gage LLP

(57) ABSTRACT

The present disclosure relates to a communication method, apparatus and system based on a voiceprint. The communication method based on the voiceprint includes: sending first information to a sever and receiving identification information sent from the server, in which the identification information is generated after the server receives the first information and the first information is one of user account information and speech information; and sending second information and the identification information to the server, in which the second information is the other one of the user account information and the speech information.

12 Claims, 3 Drawing Sheets

(56) References Cited

U.S. PATENT DOCUMENTS

| | | | | |
|---|---|---|---|---|
| 7,054,819 | B1* | 5/2006 | Loveland | G06F 21/32 345/419 |
| 8,332,223 | B2* | 12/2012 | Farrell | G07C 9/00158 379/88.03 |
| 8,620,666 | B1 | 12/2013 | Whitmore et al. | |
| 8,694,315 | B1* | 4/2014 | Sheets | G06Q 20/40145 704/246 |
| 9,172,699 | B1* | 10/2015 | Vazquez | H04L 63/0861 |
| 2001/0039619 | A1* | 11/2001 | Lapere | G06F 21/32 713/186 |
| 2002/0010646 | A1* | 1/2002 | Azuma | G06Q 20/00 705/26.43 |
| 2002/0091937 | A1* | 7/2002 | Ortiz | H04L 63/0861 726/5 |
| 2002/0194003 | A1* | 12/2002 | Mozer | G06F 21/32 704/270.1 |
| 2003/0014247 | A1* | 1/2003 | Ng | G10L 17/06 704/209 |
| 2004/0088167 | A1* | 5/2004 | Sartini | H04M 3/2218 704/270.1 |
| 2004/0107099 | A1* | 6/2004 | Charlet | G10L 17/12 704/234 |
| 2007/0255564 | A1* | 11/2007 | Yee | G10L 17/24 704/246 |
| 2008/0244734 | A1* | 10/2008 | Okaue | G06F 21/32 726/19 |
| 2008/0312926 | A1* | 12/2008 | Vair | G10L 17/16 704/249 |
| 2009/0083841 | A1* | 3/2009 | Gierach | H04L 9/3231 726/7 |
| 2009/0206993 | A1* | 8/2009 | Di Mambro | G06F 21/32 340/5.84 |
| 2010/0050245 | A1* | 2/2010 | Samatov | G06F 21/6263 726/8 |
| 2010/0306175 | A1 | 12/2010 | Johnson et al. | |
| 2011/0178931 | A1* | 7/2011 | Kia | G06Q 10/06 705/50 |
| 2012/0130714 | A1* | 5/2012 | Zeljkovic | G10L 17/24 704/235 |
| 2012/0253809 | A1* | 10/2012 | Thomas | G10L 17/24 704/246 |
| 2012/0281885 | A1* | 11/2012 | Syrdal | G10L 17/24 382/116 |
| 2013/0006626 | A1* | 1/2013 | Aiyer | G06F 21/32 704/235 |
| 2013/0080166 | A1* | 3/2013 | Buffum | G06F 21/32 704/236 |
| 2013/0227651 | A1* | 8/2013 | Schultz | G06F 21/32 726/4 |
| 2014/0109201 | A1* | 4/2014 | Israel | G06F 21/31 726/5 |
| 2014/0249819 | A1* | 9/2014 | Jaramillo | G06F 21/32 704/246 |
| 2014/0359736 | A1* | 12/2014 | Harty | H04L 63/0861 726/7 |
| 2014/0379354 | A1* | 12/2014 | Zhang | G10L 17/24 704/275 |

FOREIGN PATENT DOCUMENTS

| | | |
|---|---|---|
| CN | 103986725 A | 8/2014 |
| JP | 2003044445 A | 2/2003 |
| JP | 2004013274 A | 1/2004 |
| JP | 2004535009 A | 11/2004 |
| JP | 2009123020 A | 6/2009 |
| JP | 2012079231 A | 4/2012 |
| JP | 2014016726 A | 1/2014 |
| JP | 2015099470 A | 5/2015 |
| JP | 2015516091 A | 6/2015 |
| KR | 20100099005 A | 9/2010 |
| WO | 2005091128 A1 | 9/2005 |

OTHER PUBLICATIONS

Japanese Patent Application No. 2015-231335 Notification of Reasons for Refusal dated Dec. 20, 2016 with English translation, 10 pages.

Tsai, Chih-Fong, "On Classifying Digital Accounting Documents" The International Journal of Digital Accounting Research vol. 7, N. 13, 2007, pp. 53-71.

Korean Japanese Patent Application No. 10-2015-0187473 Notification of Reason for Refusal dispatched Jan. 13, 2017 with English translation, 9 pages.

\* cited by examiner

COMMUNICATION METHOD, APPARATUS AND SYSTEM BASED ON VOICEPRINT

CROSS-REFERENCE TO RELATED APPLICATION

This application claims priority to and benefits of Chinese Patent Application Serial No. 201510372778.X, filed with the State Intellectual Property Office of P. R. China on Jun. 30, 2015, the entire content of which is incorporated herein by reference.

FIELD

Embodiments of the present disclosure generally relate to a communication technology field, and more particularly, to a communication method, apparatus and system based on a voiceprint.

BACKGROUND

The conventional verification mode is generally based on a password, however the verification mode based on the password is easy to steal. In order to improve the security, a verification code based on a voiceprint turns up, which uses the voiceprint information of a user and is not easy to imitate, thus increasing security to a certain extent.

In the related art, in a verification process based on the voiceprint, a client generally sends the user account information and the voiceprint information to a server synchronously to be verified by the server. However, if a malicious attacker captures and analyzes the data packet in a communication link between the client and the server, the user account information and the voiceprint information also may be leaked. Thus, there is a hidden security danger of the communication manner in the related art.

SUMMARY

Embodiments of the present disclosure seek to solve at least one of the problems existing in the related art to at least some extent.

Accordingly, an objective of the present disclosure is to provide a communication method based on a voiceprint, which improves security of a voiceprint-based communication.

Another objective of the present disclosure is to provide a communication apparatus based on a voiceprint.

Another objective of the present disclosure is to provide a communication system based on a voiceprint.

In order to achieve above objectives, embodiments of a first aspect of the present disclosure provide a communication method based on a voiceprint, including: sending first information to a sever and receiving identification information sent from the server, in which the identification information is generated after the server receives the first information and the first information is one of user account information and speech information; and sending second information and the identification information to the server, in which the second information is the other one of the user account information and the speech information.

With the communication method based on the voiceprint according to the embodiments of the first aspect of the present disclosure, by sending the first information and the second information to the server in twice, a problem caused in a synchronous transmission of the first information and the second information can be prevented, thus improving the security of the voiceprint-based communication.

In order to achieve above objectives, embodiments of a second aspect of the present disclosure provide a communication method based on a voiceprint, including: receiving first information sent from a client, generating identification information and sending the identification information to the client, in which the first information is one of user account information and speech information; and receiving second information and the identification information sent from the client, in which the second information is the other one of the user account information and the speech information.

With the communication method based on the voiceprint according to the embodiments of the second aspect of the present disclosure, by receiving the first information and the second information sent by the client in twice, a problem caused in a synchronous transmission of the first information and the second information can be prevented, thus improving the security of the voiceprint-based communication.

In order to achieve above objectives, embodiments of a third aspect of the present disclosure provide a communication apparatus based on a voiceprint, including: a first interaction module, configured to send first information to a sever and receive identification information sent from the server, in which the identification information is generated after the server receives the first information and the first information is one of user account information and speech information; and a second interaction module, configured to send second information and the identification information to the server, in which the second information is the other one of the user account information and the speech information.

With the communication apparatus based on the voiceprint according to the embodiments of the third aspect of the present disclosure, by sending the first information and the second information to the server in twice, a problem caused in a synchronous transmission of the first information and the second information can be prevented, thus improving the security of the voiceprint-based communication.

In order to achieve above objectives, embodiments of a fourth aspect of the present disclosure provide a communication apparatus based on a voiceprint, including: a first interaction module, configured to receive first information sent from a client, generate identification information and send the identification information to the client, in which the first information is one of user account information and speech information; and a second interaction module, configured to receive second information and the identification information sent from the client, in which the second information is the other one of the user account information and the speech information.

With the communication apparatus based on the voiceprint according to the embodiments of the fourth aspect of the present disclosure, by receiving the first information and the second information sent by the client in twice, a problem caused in a synchronous transmission of the first information and the second information can be prevented, thus improving the security of the voiceprint-based communication.

In order to achieve above objectives, embodiments of a fifth aspect of the present disclosure provide a communication system based on a voiceprint, including: an apparatus according to the embodiments of the third aspect of the present disclosure and an apparatus according to the embodiments of the fourth aspect of the present disclosure.

With the communication system based on the voiceprint according to the embodiments of the fifth aspect of the present disclosure, a mobile terminal and the server transmit the user account information and the speech information in twice, i.e., the user account information and the speech information for verification are transmitted separately, and thus an insecurity problem caused in the synchronous transmission thereof can be prevented, so as to improve verification security. In addition, the identification information is generated randomly, thus further improving the security.

In order to achieve above objectives, embodiments of a sixth aspect of the present disclosure provide a communication apparatus based on a voiceprint, comprising: a processor; and a memory for storing instructions executable by the processor. The processor is configured to: send first information to a sever and receive identification information sent from the server, in which the identification information is generated after the server receives the first information and the first information is one of user account information and speech information; and send second information and the identification information to the server, in which the second information is the other one of the user account information and the speech information.

In order to achieve above objectives, embodiments of a seventh aspect of the present disclosure provide a communication apparatus based on a voiceprint, comprising: a processor; and a memory for storing instructions executable by the processor. The processor is configured to: receive first information sent from a client, generate identification information and send the identification information to the client, in which the first information is one of user account information and speech information; and receive second information and the identification information sent from the client, in which the second information is the other one of the user account information and the speech information.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

Above and/or additional aspects and advantages of embodiments of the present disclosure will become apparent and more readily appreciated from the following descriptions made with reference to the accompanying drawings, in which.

DETAILED DESCRIPTION

Figure 1:
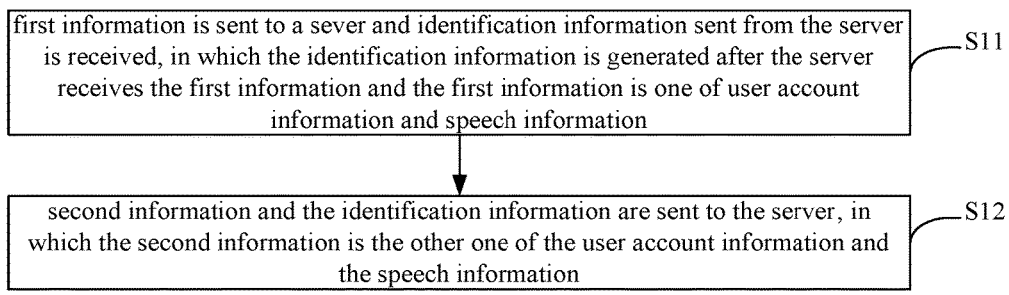
FIG. 1 is a flow chart of a communication method based on a voiceprint according to an embodiment of the present disclosure.

Reference will be made in detail to embodiments of the present disclosure. Embodiments of the present disclosure will be shown in drawings, in which the same or similar elements and the elements having same or similar functions are denoted by like reference numerals throughout the descriptions. The embodiments described herein according to drawings are explanatory and illustrative, not construed to limit the present disclosure. On the contrary, embodiments of the present disclosure include all the changes, alternatives, and modifications falling into the scope of the spirit and principles of the attached claims.

FIG. 1 is a flow chart of a communication method based on a voiceprint according to an embodiment of the present disclosure. For example, the embodiment is performed by the client, and the client is in a mobile device. The method includes following steps.

In step S11, first information is sent to a sever and identification information sent from the server is received, in which the identification information is generated after the server receives the first information and the first information is one of user account information and speech information.

In the embodiment, in order to prevent a problem caused in a synchronous transmission of the user account information and the speech information, the user account information and the speech information may be transmitted in twice so as to prevent the user account information and the speech information from being captured at the same time.

The user account information may be, for example, a user name, a phone number, a mailbox name and so on.

The method of the embodiment may be used in a registration process, or a verification process, in which the verification process may include a login verification or a payment verification.

The speech information may be different according to different application scenarios. For example, when registering, the speech information is speech data configured as a training sample, and the training sample is configured for a voiceprint training to obtain voiceprint characteristic information. Alternatively, when verifying, the speech information is speech data to be verified.

Specifically, in the registration process, the client may display a registration interface to the user, and the user may file in the user account information in the registration interface and recite a corresponding prompt content according to a prompt message of the client, so that the client can obtain the speech information to be registered.

In the verification process, the client may display a verification interface to the user, and the user may file in the user account information in the verification interface and generate a section of speech voluntarily or according to a prompt, so that the client can obtain the speech information to be verified.

In step S12, second information and the identification information are sent to the server, in which the second information is the other one of the user account information and the speech information.

The identification information may be generated by the server randomly, specifically may be a message digest 5 (MD5) code.

The client sends the identification information and the second information to the server synchronously after receiving the identification information. The server associates the first information with the second information according to the identification information, so as to perform a registration or verification according to the first information and the second information associated with each other.

In the embodiment, by sending the first information and the second information to the server in twice, the problem caused in the synchronous transmission of the first information and the second information can be prevented, thus improving the security of a voiceprint-based communication.

Figure 2:
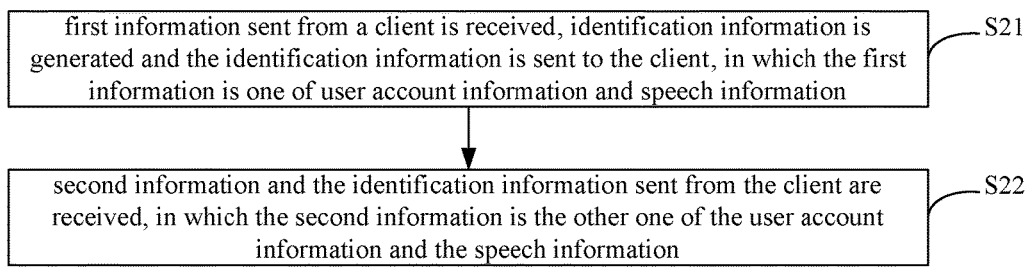
FIG. 2 is a flow chart of a communication method based on a voiceprint according to another embodiment of the present disclosure.

FIG. 2 is a flow chart of a communication method based on a voiceprint according to another embodiment of the present disclosure. An executive main body of the embodiment is the server. The method of the embodiment includes following steps.

In step S21, first information sent from a client is received, identification information is generated and the identification information is sent to the client, in which the first information is one of user account information and speech information.

The identification information is generated randomly, specifically may be a MD5 code.

The speech information may be different according to different application scenarios. For example, when registering, the speech information is speech data configured as a training sample, and the training sample is configured for a voiceprint training to obtain voiceprint characteristic information. Alternatively, when verifying, the speech information is speech data to be verified.

In step S22, second information and the identification information sent from the client are received, in which the second information is the other one of the user account information and the speech information.

The first information and the second information may be associated with each other via the identification information, so as to perform a registration or verification according to the first information and the second information associated with each other.

In the embodiment, by receiving the first information and the second information sent by the client in twice, a problem caused in a synchronous transmission of the first information and the second information can be prevented, thus improving the security of the voiceprint-based communication.

Figure 3:
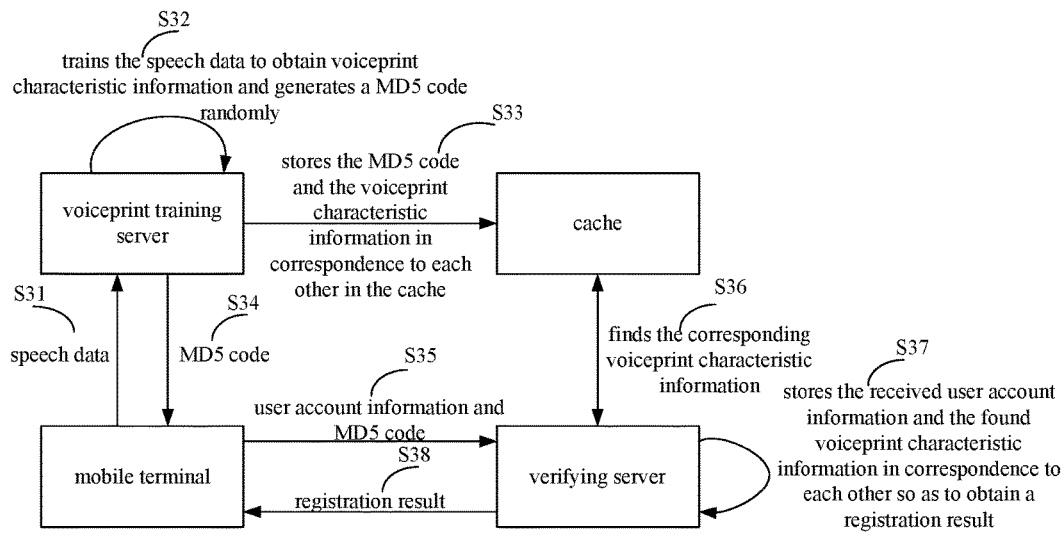
FIG. 3 is a flow chart of a communication method based on a voiceprint according to another embodiment of the present disclosure.

FIG. 3 is a flow chart of a communication method based on a voiceprint according to another embodiment of the present disclosure. For example, the method may be used in a registration process. In the embodiment, for example, a client includes a mobile terminal, and a server includes a voiceprint training server, a cache and a verifying server. As shown in FIG. 3, the method includes following steps.

In step S31, the mobile terminal sends speech data to the voiceprint training server.

The mobile terminal may display a prompt text to a user, which for example includes a plurality of numbers, and prompt the user to recite these numbers. After the user recite these numbers, the mobile terminal may obtain the speech data recited by the user and then sends the speech data corresponding to the numbers to the voiceprint training server.

In step S32, the voiceprint training server trains the speech data to obtain voiceprint characteristic information and generates a MD5 code randomly.

After receiving the speech data, the voiceprint training server judges whether the received speech data is consistent with the prompt text. If the received speech data is consistent with the prompt text, the voiceprint training server further trains the speech data to obtain the voiceprint characteristic information, which may be referred to the related art.

The voiceprint training server may generate the MD5 code randomly after obtaining the voiceprint characteristic information.

In step S33, the voiceprint training server stores the MD5 code and the voiceprint characteristic information in correspondence to each other in the cache.

In step S34, the voiceprint training server sends the MD5 code to the mobile terminal.

Timing sequences of step S33 and step S34 are not limited.

In step S35, the mobile terminal sends the MD5 code and user account information to the verifying server.

When registering, the mobile terminal displays a registration interface to the user, and the user files in the user account information in the registration interface, so that the mobile terminal can obtain the user account information.

In step S36, the verifying server verifies validity of the MD5 code, if the MD5 code is valid, the verifying server finds the corresponding voiceprint characteristic information in the cache according to the MD5 code.

After receiving the MD5 code, the verifying server may verify the validity of the MD5 code first. For example, the verifying server searches the cache and judges whether the received MD5 code is in the cache. If the received MD5 code is in the cache, the verifying server determines that the MD5 code is valid; if the received MD5 code is not in the cache, the verifying server determines that the MD5 code is invalid.

After it is determined that the MD5 code is valid, the corresponding voiceprint characteristic information can be found.

In step S37, the verifying server stores the received user account information and the found voiceprint characteristic information in correspondence to each other so as to obtain a registration result.

The registration result can be obtained after the verifying server stores the received user account information and the found voiceprint characteristic information in correspondence to each other. For example, after the received user account information and the found voiceprint characteristic information are stored in correspondence to each other successfully, the registration is successful; otherwise, the registration is failed.

In step S38, the verifying server sends the registration result to the mobile terminal, for example, the registration is successful, or the registration is failed.

It may be understood that, the voiceprint training server, the cache and the verifying server in the embodiment may be disposed in a same physical device or different physical devices.

In the embodiment, when the mobile terminal is registered to the server, the user account information and the speech information for registration are transmitted separately, and thus an insecurity problem caused in the synchronous transmission thereof can be prevented, so as to improve registration security. In addition, the identification information is generated randomly, thus further improving the security.

Figure 4:
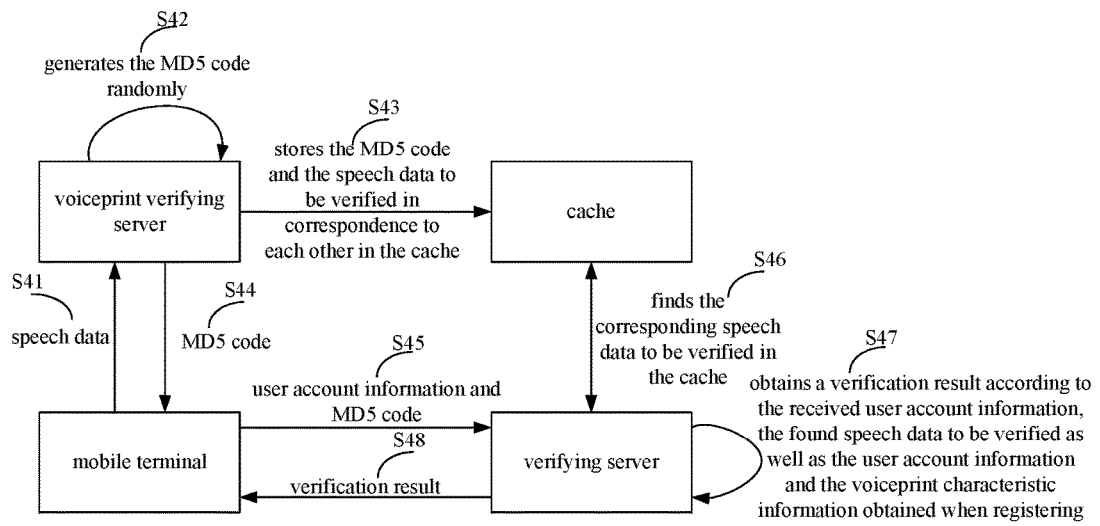
FIG. 4 is a flow chart of a communication method based on a voiceprint according to another embodiment of the present disclosure.

FIG. 4 is a flow chart of a communication method based on a voiceprint according to another embodiment of the present disclosure. For example, the method is used in a verification process. In the embodiment, for example, a client includes a mobile terminal, and the server includes a voiceprint verifying server, a cache and a verifying server. As shown in FIG. 4, the method includes following steps.

In step S41, the mobile terminal sends speech data to the voiceprint verifying server.

The mobile terminal may display a verification interface to a user, the user may record the speech data to be verified after clicking a recording button in the verification interface, and the mobile terminal sends the speech data to be verified to the voiceprint verifying server after obtaining the speech data recited by the user. The speech data to be verified recorded by the user may be recited according to a prompt text or without a prompt.

In step S42, the voiceprint verifying server receives the speech data to be verified and generates a MD5 code randomly.

If the speech data is obtained according to the prompt text, after receiving the speech data, the voiceprint verifying server may first judge whether the received speech data is consistent with the prompt text. If the received speech data is consistent with the prompt text, the voiceprint verifying server then generates the MD5 code.

In step S43, the voiceprint verifying server stores the MD5 code and the speech data to be verified in correspondence to each other in the cache.

In step S44, the voiceprint verifying server sends the MD5 code to the mobile terminal.

Timing sequences of step S43 and step S44 are not limited.

In step S45, the mobile terminal sends the MD5 code and user account information to the verifying server.

When verifying, the mobile terminal displays the verification interface to the user, and the user files in the user account information in the verification interface, so that the mobile terminal obtains the user account information.

In step S46, the verifying server verifies validity of the MD5 code, if the MD5 code is valid, the verifying server finds the corresponding speech data to be verified in the cache according to the MD5 code.

After receiving the MD5 code, the verifying server may verify the validity of the MD5 code first. For example, the verifying server searches the cache and judges whether the received MD5 code is in the cache. If the received MD5 code is in the cache, the verifying server determines that the MD5 code is valid; if the received MD5 code is not in the cache, the verifying server determines that the MD5 code is invalid.

After it is determined that the MD5 code is valid, the corresponding speech data to be verified can be found.

In step S47, the verifying server obtains a verification result according to the received user account information, the found speech data to be verified as well as the user account information and the voiceprint characteristic information obtained when registering.

When it is determined that the MD5 is valid, the user account information and the speech data to be verified may be associated with each other via the MD5 code. Then, the voiceprint characteristic information corresponding to the received user account information can be found according to the received user account information and a correspondence between the user account information and the voiceprint characteristic information obtained when registering. Subsequently, the speech data to be verified associated with the received user account information and the found voiceprint characteristic information are compared with each other so as to obtain the verification result. For example, a similarity value between the speech data to be verified and the voiceprint characteristic information is calculated, if the similarity value is larger than a threshold, the verification is successful; otherwise, the verification is failed. Certainly, it may be understood that, the verification result may be obtained according to the speech data to be verified and the voiceprint characteristic information by using known technologies.

In step S47, the verifying server sends the verification result to the mobile terminal, for example, the verification is successful, or the verification is failed.

It may be understood that, the voiceprint verifying server, the cache and the verifying server in the embodiment may be disposed in a same physical device or different physical devices.

In the embodiment, when the mobile terminal is registered to the server, the user account information and the speech information for verification is transmitted separately, and thus an insecurity problem caused in the synchronous transmission thereof can be prevented, so as to improve verification security. In addition, the identification information is generated randomly, thus further improving the security.

Figure 5:
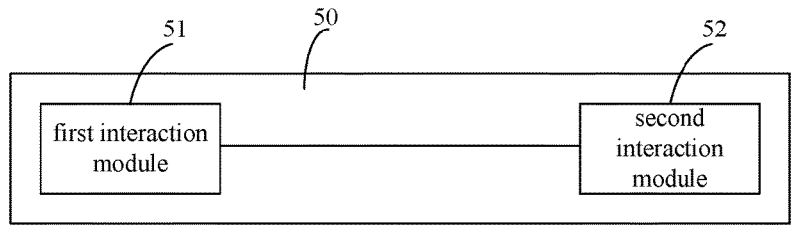
FIG. 5 is a schematic view of a communication apparatus based on a voiceprint according to an embodiment of the present disclosure.

FIG. 5 is a schematic view of a communication apparatus based on a voiceprint according to an embodiment of the present disclosure. The apparatus is in a client, for example in a mobile device. The apparatus 50 includes a first interaction module 51 and a second interaction module 52.

The first interaction module 51 is configured to send first information to a sever and receive identification information sent from the server, in which the identification information is generated after the server receives the first information and the first information is one of user account information and speech information.

In the embodiment, in order to prevent a problem caused in a synchronous transmission of the user account information and the speech information, the user account information and the speech information may be transmitted in twice so as to prevent the user account information and the speech information from being captured at the same time.

The user account information may be, for example, a user name, a phone number, a mailbox name and so on.

The apparatus of the embodiment may be used in a registration process, or a verification process, in which the verification process may include a login verification or a payment verification.

The speech information may be different according to different application scenarios. For example, when registering, the speech information is speech data configured as a training sample, and the training sample is configured for a voiceprint training to obtain voiceprint characteristic information. Alternatively, when verifying, the speech information is speech data to be verified.

Specifically, in the registration process, the client may display a registration interface to the user, and the user may file in the user account information in the registration interface and recite a corresponding prompt content according to a prompt message of the client, so that the client can obtain the speech information to be registered.

In the verification process, the client may display a verification interface to the user, and the user may file in the user account information in the verification interface and generate a section of speech voluntarily or according to a prompt, so that the client can obtain the speech information to be verified.

The second interaction module 52 is configured to send second information and the identification information to the server, in which the second information is the other one of the user account information and the speech information.

The identification information may be generated by the server randomly, specifically may be a message digest 5 (MD5) code.

The client sends the identification information and the second information to the server synchronously after receiving the identification information. The server associates the first information with the second information according to the identification information, so as to perform a registration or verification according to the first information and the second information associated with each other.

In the embodiment, by sending the first information and the second information to the server in twice, the problem caused in the synchronous transmission of the first information and the second information can be prevented, thus improving the security of a voiceprint-based communication.

Figure 6:
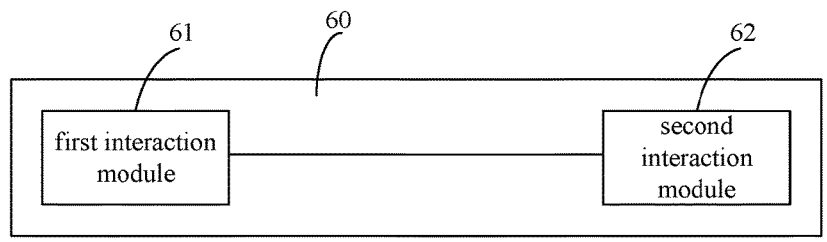
FIG. 6 is a schematic view of a communication apparatus based on a voiceprint according to another embodiment of the present disclosure.

FIG. 6 is a schematic view of a communication apparatus based on a voiceprint according to another embodiment of the present disclosure. The apparatus is in the server. The apparatus 60 includes: a first interaction module 61 and a second interaction module 62.

The first interaction module 61 is configured to receive first information sent from a client, generate identification information and send the identification information to the client, in which the first information is one of user account information and speech information.

Optionally, the first interaction module 61 is further configured to generate the identification information randomly.

The identification information is generated randomly, specifically may be a MD5 code.

The speech information may be different according to different application scenarios. For example, when registering, the speech information is speech data configured as a training sample, and the training sample is configured for a voiceprint training to obtain voiceprint characteristic information. Alternatively, when verifying, the speech information is speech data to be verified.

The second interaction module 62 is configured to receive second information and the identification information sent from the client, in which the second information is the other one of the user account information and the speech information.

The first information and the second information may be associated with each via the identification information, so as to perform a registration or verification according to the first information and the second information associated with each other.

In the embodiment, by receiving the first information and the second information sent by the client in twice, a problem caused in a synchronous transmission of the first information and the second information can be prevented, thus improving the security of the voiceprint-based communication.

Figure 7:
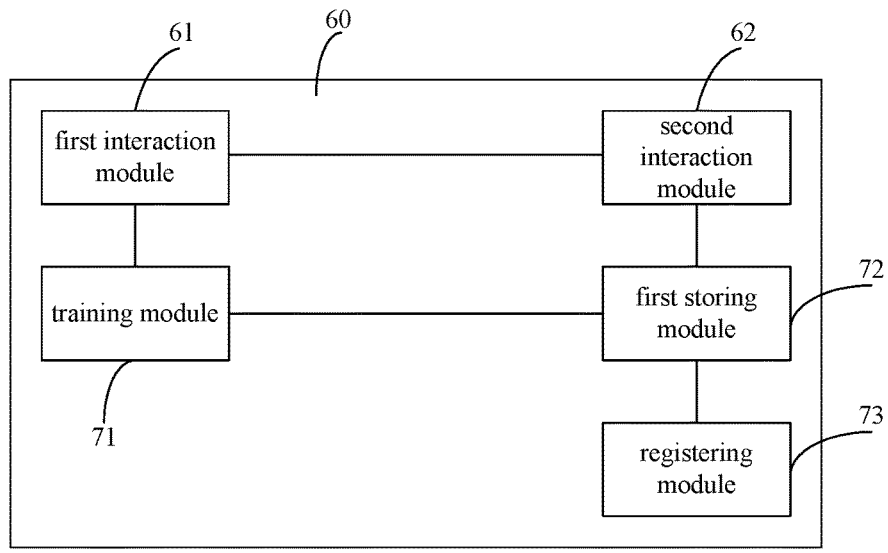
FIG. 7 is a schematic view of a communication apparatus based on a voiceprint according to another embodiment of the present disclosure.

In another embodiment, as shown in FIG. 7, the first information is the speech information and the second information is the user account information, when registering, the speech information is speech data configured as a training sample, the training sample is configured for a voiceprint training to obtain voiceprint characteristic information, and the apparatus 60 further includes: a training module 71, a first storing module 72 and a registering module 73.

The training module 71 is configured to train the speech data configured as the training sample to obtain the voiceprint characteristic information after receiving the speech data configured as the training sample.

After the speech data is received, it is judged whether the received speech data is consistent with the prompt text. If the received speech data is consistent with the prompt text, the speech data is further trained to obtain the voiceprint characteristic information, which may be referred to the related art.

The identification information may be a randomly generated MD5 code.

The first storing module 72 is configured to store the identification information and the voiceprint characteristic information in correspondence to each other.

For example, the first storing module may be a cache.

The registering module 73 is configured to find the voiceprint characteristic information corresponding to the received identification information from pre-stored data after receiving the user account information and the identification information, and store the received user account information and the found voiceprint characteristic information in correspondence to each other to obtain a registration result.

After receiving the MD5 code, validity of the MD5 code is verified first. For example, the registering module searches the cache and judges whether the received MD5 code is in the cache. If the received MD5 code is in the cache, the MD5 code is determined to be valid; if the received MD5 code is not in the cache, the MD5 code is determined to be invalid.

After it is determined that the MD5 code is valid, the user account information and the voiceprint characteristic information may be stored in correspondence to each other, so as to obtain the registration result. For example, after the user account information and the voiceprint characteristic information are stored in correspondence to each other successfully, the registration is successful; otherwise, the registration is failed.

In the embodiment, when the mobile terminal is registered to the server, the user account information and the speech information for registration are transmitted separately, and thus an insecurity problem caused in the synchronous transmission thereof can be prevented, so as to improve registration security. In addition, the identification information is generated randomly, thus further improving the security.

Figure 8:
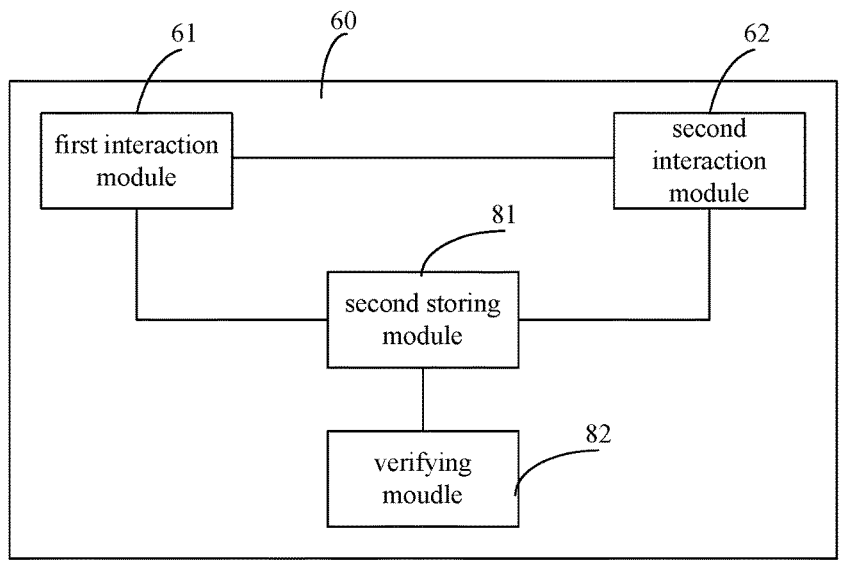
FIG. 8 is a schematic view of a communication apparatus based on a voiceprint according to another embodiment of the present disclosure.

In another embodiment, as shown in FIG. 8, the first information is the speech information and the second information is the user account information, when verifying, the speech information is speech data to be verified, and the apparatus 60 further includes: a second storing module 81 and a verifying module 82.

The second storing module 81 is configured to store the identification information and the speech data to be verified in correspondence to each other after receiving the speech data to be verified and generating the identification information.

For example, the second storing module may be a cache.

The verifying module 82 is configured to find the speech data to be verified corresponding to the received identification information from pre-stored data after receiving the user account information and the identification information, and obtain a verification result according to the received user account information, the found speech data to be verified as well as the user account information and the voiceprint characteristic information obtained when registering.

After the MD5 code is received, the validity of the MD5 code is verified first. For example, the verifying module searches the cache and judges whether the received MD5 code is in the cache. If the received MD5 code is in the cache, the verifying module determines that the MD5 code is valid; if the received MD5 code is not in the cache, the verifying module determines that the MD5 code is invalid.

After it is determined that the MD5 is valid, the user account information and the speech data to be verified may be associated with each other via the MD5 code. Then, the voiceprint characteristic information corresponding to the received user account information can be found according to the received user account information and a correspondence between the user account information and the voiceprint characteristic information obtained when registering. Subsequently, the speech data to be verified associated with the received user account information and the found voiceprint characteristic information are compared with each other so as to obtain the verification result. For example, a similarity value between the speech data to be verified and the voiceprint characteristic information is calculated, if the similarity value is larger than a threshold, the verification is successful; otherwise, the verification is failed. Certainly, it may be understood that, the verification result may be obtained according to the speech data to be verified and the voiceprint characteristic information by using known technologies.

In the embodiment, when the mobile terminal is registered to the server, the user account information and the speech information for verification are transmitted separately, and thus an insecurity problem caused in the synchronous transmission thereof can be prevented, so as to improve verification security. In addition, the identification information is generated randomly, thus further improving the security.

Figure 9:
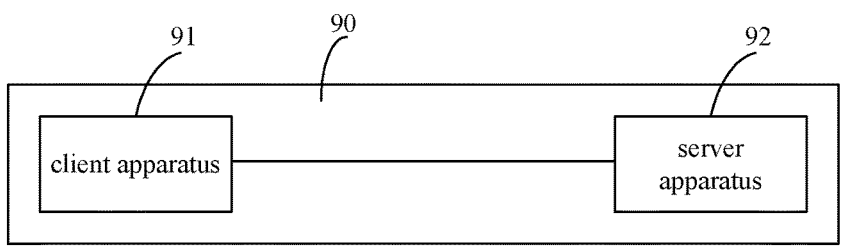
FIG. 9 is a schematic view of a communication system based on a voiceprint according to an embodiment of the present disclosure.

FIG. 9 is a schematic view of a communication system based on a voiceprint according to an embodiment of the present disclosure. The system 70 includes: a client apparatus 91 and a server apparatus 92, in which the client apparatus 91 is one shown in FIG. 5 and the server apparatus 92 is one shown in FIGS. 6-8.

In the embodiment, a mobile terminal and a server transmit the user account information and the speech information in twice, i.e., the user account information and the speech information for verification are transmitted separately, and thus an insecurity problem caused in the synchronous transmission thereof can be prevented, so as to improve verification security. In addition, the identification information is generated randomly, thus further improving the security.

According to an embodiment of the present disclosure, a communication apparatus based on a voiceprint is provided. The apparatus includes: a processor; and a memory for storing instructions executable by the processor. The processor is configured to: send first information to a sever and receive identification information sent from the server, in which the identification information is generated after the server receives the first information and the first information is one of user account information and speech information; and send second information and the identification information to the server, in which the second information is the other one of the user account information and the speech information.

In some embodiments, the first information is the speech information and the second information is the user account information.

In some embodiments, the identification information is generated randomly.

According to an embodiment of the present disclosure, a communication apparatus based on a voiceprint is provided. The apparatus includes: a processor; and a memory for storing instructions executable by the processor. The processor is configured to: receive first information sent from a client, generate identification information and send the identification information to the client, in which the first information is one of user account information and speech information; and receive second information and the identification information sent from the client, in which the second information is the other one of the user account information and the speech information.

In some embodiments, the first information is the speech information and the second information is the user account information.

In some embodiments, when registering, the speech information is speech data configured as a training sample and the training sample is configured for a voiceprint training to obtain voiceprint characteristic information, and the processor is further configured to: train the speech data configured as the training sample to obtain the voiceprint characteristic information after receiving the speech data configured as the training sample; store the identification information and the voiceprint characteristic information in correspondence to each other; and find the voiceprint characteristic information corresponding to the identification information from pre-stored data after receiving the user account information and the identification information, and store the received user account information and the found voiceprint characteristic information in correspondence to each other to obtain a registration result.

In some embodiments, when verifying, the speech information is speech data to be verified, and the processor is further configured to: store the identification information and the speech data to be verified in correspondence to each other after receiving the speech data to be verified and generating the identification information; and find the speech data to be verified corresponding to the identification information from pre-stored data after receiving the user account information and the identification information, and obtain a verification result according to the received user account information, the found speech data to be verified as well as the user account information and the voiceprint characteristic information obtained when registering.

In some embodiments, the processor generates identification information by: generating the identification information randomly.

It is to be understood that, in the description of the present disclosure, terms of "first" and "second" are only used for description and cannot be seen as indicating or implying relative importance. Furthermore, in the description of the present disclosure, unless otherwise explained, it is to be understood that a term of "a plurality of" refers to two or more.

Any procedure or method described in the flow charts or described in any other way herein may be understood to comprise one or more modules, portions or parts for storing executable codes that realize particular logic functions or procedures. Moreover, advantageous embodiments of the present disclosure comprises other implementations in which the order of execution is different from that which is depicted or discussed, including executing functions in a substantially simultaneous manner or in an opposite order according to the related functions. This should be understood by those skilled in the art which embodiments of the present disclosure belong to.

It is understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as an standalone product, the integrated module may be stored in a computer readable storage medium.

The storage medium mentioned above may be read-only memories, magnetic disks or CD, etc.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. The appearances of the phrases throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A communication method based on a voiceprint, comprising:
    sending first information to a sever and receiving identification information sent from the server, the identification information being generated after the server receives the first information and the first information is speech information; and
    sending second information and the identification information to the server, the second information being user account information, and the second information being different from the first information,
    performing, by the server, a registration or verification based on an association between the first and second information according to the identification information.

2. The method according to claim 1, the identification information being generated randomly.

3. A communication method based on a voiceprint, comprising:

receiving first information sent from a client, generating identification information and sending the identification information to the client, the first information being speech information; and
    receiving second information and the identification information sent from the client, the second information being user account information, and the second information being different from the first information; associating the first information with the second information according to the identification; and,
    performing a registration or verification according to the associated first and second information.

4. The method according to claim 3, when registering, the speech information being speech data configured as a training sample and the training sample being configured for a voiceprint training to obtain voiceprint characteristic information, and the method further comprises:
    training the speech data configured as the training sample to obtain the voiceprint characteristic information after receiving the speech data configured as the training sample;
    storing the identification information and the voiceprint characteristic information in correspondence to each other; and
    finding the voiceprint characteristic information corresponding to the identification information from pre-stored data after receiving the user account information and the identification information, and storing the received user account information and the found voiceprint characteristic information in correspondence to each other to obtain a registration result.

5. The method according to claim 3, when verifying, the speech information being speech data to be verified, and the method further comprises:
    storing the identification information and the speech data to be verified in correspondence to each other after receiving the speech data to be verified and generating the identification information; and
    finding the speech data to be verified corresponding to the identification information from pre-stored data after receiving the user account information and the identification information, and obtaining a verification result according to the received user account information, the found speech data to be verified as well as the user account information and the voiceprint characteristic information obtained when registering.

6. The method according to claim 3, generating identification information comprising:
    generating the identification information randomly.

7. A communication apparatus based on a voiceprint, comprising:
    a processor; and
    a memory for storing instructions executable by the processor;
    the processor being configured to:
        send first information to a sever and receive identification information sent from the server, the identification information being generated after the server receives the first information and the first information being speech information; and
        send second information and the identification information to the server, the second information being user account information, and the second information being different from the first information;
        the first information being associated with the second information according to the identification information in the server, and the associated first and second information being used by the server to perform a registration or verification.

8. The apparatus according to claim 7, the identification information being generated randomly.

9. A communication apparatus based on a voiceprint, comprising:
   a processor; and
   a memory for storing instructions executable by the processor;
   the processor being configured to:
      receive first information sent from a client, generate identification information and send the identification information to the client, the first information being speech information; and
      receive second information and the identification information sent from the client, the second information being user account information, and the second information being different from the first information;
      associate the first information with the second information according to the identification; and,
      perform a registration or verification according to the associated first and second information.

10. The apparatus according to claim 9, when registering, the speech information being speech data configured as a training sample and the training sample being configured for a voiceprint training to obtain voiceprint characteristic information, and the processor being further configured to:
   train the speech data configured as the training sample to obtain the voiceprint characteristic information after receiving the speech data configured as the training sample;
   store the identification information and the voiceprint characteristic information in correspondence to each other; and
   find the voiceprint characteristic information corresponding to the identification information from pre-stored data after receiving the user account information and the identification information, and store the received user account information and the found voiceprint characteristic information in correspondence to each other to obtain a registration result.

11. The apparatus according to claim 9, when verifying, the speech information being speech data to be verified, and the processor being further configured to:
   store the identification information and the speech data to be verified in correspondence to each other after receiving the speech data to be verified and generating the identification information; and
   find the speech data to be verified corresponding to the identification information from pre-stored data after receiving the user account information and the identification information, and obtain a verification result according to the received user account information, the found speech data to be verified as well as the user account information and the voiceprint characteristic information obtained when registering.

12. The apparatus according to claim 9, the processor generating identification information by:
   generating the identification information randomly.

* * * * *